(12) United States Patent
Cerreta (10) Patent No.: US 9,534,641 B2
(45) Date of Patent: Jan. 3, 2017

(54) FOLDED SEAL RETENTION PLATE WITH THRUST SURFACE

(71) Applicant: Schaeffler Technologies AG & Co. KG, Herzogenaurach (DE)

(72) Inventor: Joshua David Cerreta, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 158 days.

(21) Appl. No.: 14/629,719

(22) Filed: Feb. 24, 2015

(65) Prior Publication Data

US 2015/0247538 A1 Sep. 3, 2015

Related U.S. Application Data

(60) Provisional application No. 61/945,879, filed on Feb. 28, 2014.

(51) Int. Cl.
| | |
|---|---|
| *F16D 33/18* | (2006.01) |
| *F16J 1/00* | (2006.01) |
| *F16D 25/12* | (2006.01) |
| *F16H 45/02* | (2006.01) |
| *F16J 15/16* | (2006.01) |

(52) U.S. Cl.
CPC ............. *F16D 25/12* (2013.01); *F16H 45/02* (2013.01); *F16J 15/16* (2013.01); *F16D 2300/08* (2013.01); *F16H 2045/0205* (2013.01); *F16H 2045/0215* (2013.01); *F16H 2045/0231* (2013.01); *F16H 2045/0263* (2013.01); *F16H 2045/0278* (2013.01)

(58) Field of Classification Search
CPC ............ F16J 15/164; F16J 1/008; F16J 15/24; F16J 15/441; F16J 15/56; F16J 9/063; F16J 9/20; F16J 9/26; F16J 15/3236; F16J 15/3436; F16J 15/36; F16H 45/00–2045/0294; F16D 25/12
See application file for complete search history.

(56) References Cited

U.S. PATENT DOCUMENTS

| | | | | |
|---|---|---|---|---|
| 3,368,820 A | * | 2/1968 | Bialkowski | ............ F16J 15/164 |
| | | | | 277/377 |
| 2012/0006642 A1 | * | 1/2012 | Greathouse | ............. F16H 45/02 |
| | | | | 192/3.29 |
| 2012/0161400 A1 | | 6/2012 | George | |
| 2014/0346737 A1 | | 11/2014 | Harris et al. | |

* cited by examiner

*Primary Examiner* — Ramya Burgess
*Assistant Examiner* — Lillian Nguyen
(74) *Attorney, Agent, or Firm* — Kevin L. Parks (57) ABSTRACT

A seal retention plate for a torque converter, the plate comprising: an annular body portion having a first surface; a second surface opposite the first surface; an interior portion having at least one first hole; at least one radially outer tab extending from the interior portion and folded to contact the second surface so as to provide a thrust surface; and a center opening.

20 Claims, 7 Drawing Sheets

FOLDED SEAL RETENTION PLATE WITH THRUST SURFACE

CROSS-REFERENCE TO RELATED APPLICATIONS

This application claims the benefit under 35 U.S.C. §119 (e) of U.S. Provisional Application No. 61/945,879, filed Feb. 28, 2014, which application is incorporated herein by reference in its entirety.

FIELD

The invention relates generally to a seal retention plate for a torque converter, where the seal retention plate includes a thrust surface.

BACKGROUND

U.S. Patent Publication No. 2014/0346737, hereby incorporated by reference herein, describes a piston seal assembly including a piston, plate, and seal. The piston includes a recess, wherein the seal is disposed at least partially within the recess. The plate is fastened to the piston and extends at least partially adjacent to the recess. The seal is axially movable between the piston and the plate via hydraulic fluid pressure.

U.S. Patent Publication No. 2012/0161400, hereby incorporated by reference herein, describes a bi-directional clip seal piston.

To retain a seal in a piston assembly for a torque converter, it is known to position the seal between the piston and a plate to prevent extrusion or displacement of the seal. Incorporating plates for this purpose in limited torus size torque converters is difficult.

BRIEF SUMMARY

Example aspects broadly comprise a seal retention plate for a torque converter, the plate comprising: an annular body portion having: a first surface; a second surface opposite the first surface; an interior portion having at least one first hole; at least one radially outer tab extending from the interior portion and folded to contact the second surface so as to provide a thrust surface; and a center opening. In an example aspect, the at least one radially outer tab includes a second hole, where the second hole is aligned with the first hole and where the diameter of the second hole is greater than the diameter of the first hole. In an example aspect, the first hole is arranged for receiving a rivet and the second hole is arranged for receiving a rivet head. In an example aspect, the plate includes a plurality of outer tabs wherein each alternate tab includes the second hole for receiving a rivet head. In an example aspect, the plate includes scallops disposed on opposite sides of the outer tabs, where the scallops extend at least partially into the interior portion. In an example aspect, the at least one tab includes a base having a first width, radially outward tapered sides, and a tip having a second width, and where the first width is greater than the second width. In an example aspect, the tabs are folded along a line connecting the sides at the base. In an example aspect, the interior portion includes a first radial portion, a slant portion, and a second radial portion. In an example aspect, the first radial portion and the second radial portion are arranged in parallel displacement to each other, and having the slant portion located therebetween.

Other example aspects broadly comprise a piston seal assembly comprising: a piston including a recess on a first inner radial portion; a seal retention plate having: an interior portion having a first thickness; a plurality of radially outer tabs having a second thickness extending from the interior portion, each tab having a base and radially outward tapered sides, each tab folded along the base so as to contact the interior portion and to provide a thrust portion having a total thickness; and a center opening; at least one fastener for fixedly attaching the piston to the seal retention plate; and a seal located between the piston recess and the interior portion of the seal retention plate. In an example aspect, the first thickness is equal to the second thickness. In an example aspect, the seal is arranged for sealing engagement with a transmission input shaft, and where the piston is arranged to be slidably supported on the transmission input shaft. In an example aspect, the interior portion includes a first hole and the outer tab includes a second hole, where the second hole is aligned with the first hole and where the diameter of the second hole is greater than the diameter of the first hole. In an example aspect, the fastener is a rivet including a rivet head, and where the first hole is arranged for receiving the rivet and where the second hole is arranged for receiving the rivet head. In an example aspect, the rivet head has a third thickness, where the third thickness is at most equal to the second thickness. In an example aspect, the plurality of outer tabs alternately includes the second hole for receiving a rivet head. In an example aspect, seal retention plate includes scallops located on opposite sides of the outer tabs, and where the scallops extend at least partially into the interior portion. In an example aspect, the outer tabs include a base having a first width, radially outward tapered sides, and a tip having a second width, and where the first width is greater than the second width. In an example aspect, the tabs are folded along a line connecting the sides at the base. In an example aspect, the interior portion includes a first radial portion, a slant portion, and a second radial portion. In an example aspect, the first radial portion and the second radial portion are arranged in parallel displacement to each other, and having the slant portion located therebetween. In an example aspect, the second radial portion cooperates with the piston recess to prevent axial displacement of the seal.

Other example aspects broadly comprise a torque converter assembly comprising: a seal arranged for sealing engagement with a transmission input shaft; a piston arranged to be slidably supported on the transmission input shaft and including a recess for the seal; a flange; the seal retention plate where the first surface faces the piston and the thrust surface faces the flange; and, a fastener for fixedly attaching the piston to the seal retention plate.

Other example aspects broadly comprise a torque converter assembly assembly comprising: a piston including a recess on a first inner radial portion; a seal retention plate having: an interior portion having a first thickness; a plurality of radially outer tabs having a second thickness extending from the interior portion, each tab having a base and radially outward tapered sides, each tab folded along the base so as to contact the interior portion and to provide a thrust portion having a total thickness; and a center opening; at least one fastener for fixedly attaching the piston to the seal retention plate; a flange facing the thrust portion; and, a seal located between the piston recess and the interior portion of the seal retention plate. In an example aspect, the seal is arranged for sealing engagement with a transmission input shaft, and where the piston is arranged to be slidably supported on the transmission input shaft. In an example aspect, the interior portion includes a first hole and the outer tab includes a second hole, where the second hole is aligned with the first hole and where the diameter of the second hole is greater than the diameter of the first hole. In an example aspect, the fastener is a rivet including a rivet head, and where the first hole is arranged for receiving the rivet and where the second hole is arranged for receiving the rivet head, and where the rivet head has a third thickness, where the third thickness is at most equal to the second thickness. In an example aspect, the seal retention plate includes scallops located on opposite sides of the outer tabs, and where the scallops extend at least partially into the interior portion. In an example aspect, the interior portion includes a first radial portion, a slant portion, and a second radial portion, and where the first radial portion and the second radial portion are arranged in parallel displacement to each other, and having the slant portion located therebetween, and where the second radial portion cooperates with the piston recess to prevent axial displacement of the seal.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
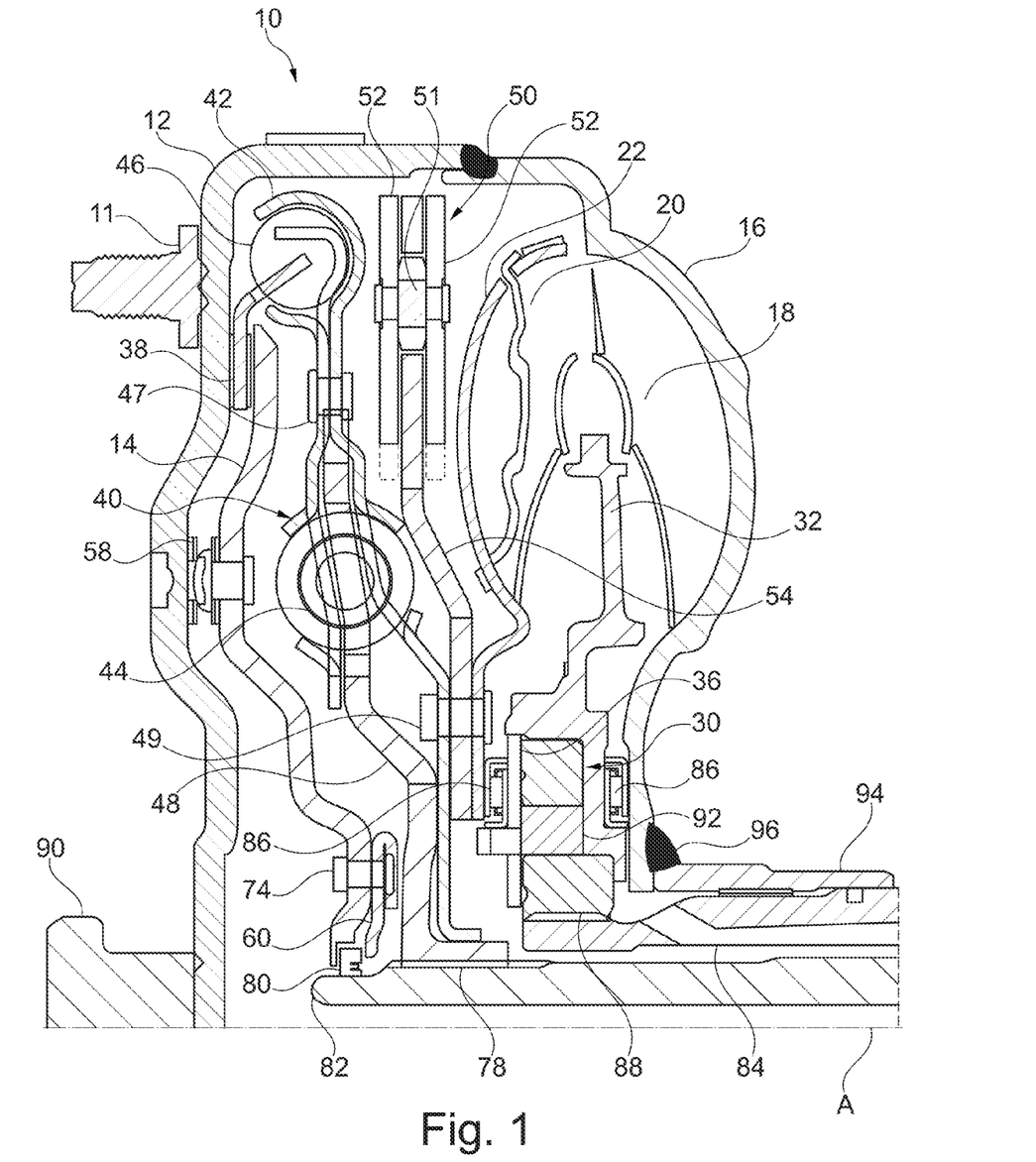
FIG. 1 illustrates a cross sectional side view of a torque converter including a folded seal retention plate according to an example aspect.

The following description is made with reference to FIGS. 1-6. FIG. 1 illustrates a cross sectional side view of a torque converter including a folded seal retention plate according to an example aspect. Torque converter 10 includes front cover 12 for connecting to a crankshaft of an internal combustion engine via stud 11 and rear cover 16, also referred to as impeller shell interchangeably herein, for an impeller 18. Impellers are also referred to in the art interchangeably as 'pump'. Torque converter 10 also includes turbine 20, turbine shell 22, stator 32 between turbine 20 and impeller 18, and one-way clutch 30 supporting stator 32. Side plate 36 holds one-way clutch 30 in place within stator 32. Torque converter 10 includes axis A.

Torque converter 10 includes piston 14, clutch plate 38, and leaf springs 58. Leaf springs 58 connect front cover 12 and piston 14. Torque converter 10 further includes damper assembly 40 including spring retainer 42, springs 44, radially outward springs 46, flange 48, and rivets 47, 49. Damper assembly 40 is connected to and drivable by turbine 20, and is positioned between turbine 20 and front cover 12. Torque converter 10 further includes pendulum assembly 50 including pendulum weights 52 connected by connecting element 51 and pendulum flange 54.

Torque converter 10 includes folded seal retention plate 60 and seal 80. For the purposes herein, 'folded seal retention plate' 60 may be referred to as 'folded washer', 'seal retention plate', or as simply 'plate' interchangeably. Seal retention plate 60 is attached to piston 14 by fastener 74. In an example aspect, the fastener is a rivet. Torque converter 10 further includes bearings 86, inner race 88, roller 92 for one-way clutch 30, hub 94, and weld 96. Cover pilot 90 is shown in FIG. 1 as are transmission components spline 78, input shaft 82 and stator shaft 84. Seal 80 is engaged with shaft 82 and positioned between radially inward portions of piston 14 and folded seal retention plate 60. Seal 80, which is a dynamic seal, is a teflon seal in an example aspect; alternatively, seal 80 is an o-ring.

Figure 2:
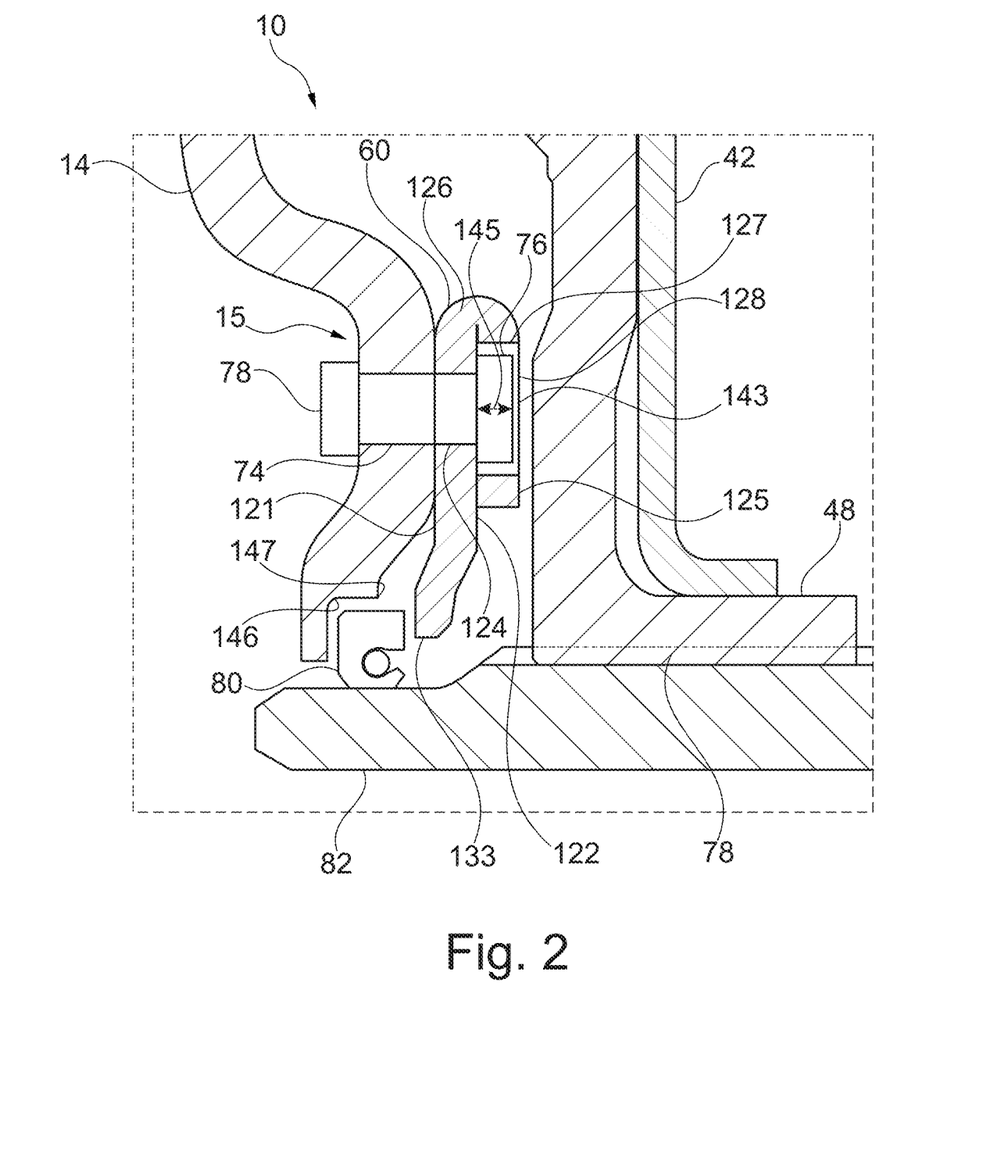
FIG. 2 illustrates a partial cross sectional side view of a torque converter including seal retention plate according to an example aspect.

FIG. 2 illustrates a partial cross sectional side view of a torque converter including seal retention plate according to an example aspect. Piston 14 is attached to seal retention plate 60, having first hole 124 and second hole 127, by fastener 74. Fastener 74, in an example aspect, is a rivet including head 76 having thickness 145 and upset portion 78. Thickness 145 is at most equal to the thickness of outer tab 125. That is, rivet heat 76 is counterbored to sit planar or flush with the folded outer tab surface facing flange 48. Alternatively, counterbored rivet heat 74 lies slightly recessed with respect to the folded outer tab surface. Rivet head 76 does not protrude from the surface of outer tab 125, which is also referred to as thrust surface 128.

Seal retention plate 60 includes thrust portion 143 facing flange 48, which is adjacent to spring retainer 42. Thrust portion 143 includes thrust surface 128. Thrust surface 128 between piston 14 and flange 48 is advantageously incorporated into the seal retention plate to minimize space. Seal retention plate 60 including thrust surface 128 also advantageously accommodates fastener 74 connecting piston 14 and flange 48. Such space saving elements are desired in torque converter designs requiring smaller torus size.

Seal retention plate 60, having a first surface 121 and a second surface 122 opposite first surface 121, includes folded portion 126, and inner circumferential edge 133. Piston 14 includes piston recess 146 and first inner radial portion 147. Piston recess 146 and seal retention plate 60 are arranged for preventing displacement of seal 80. Piston recess 146 and seal retention plate 60 are configured in shape to compliment shape and size of seal 80 and, as such, may vary in size, shape, and configuration as those in the art would expect. Seal 80 is engaged with transmission input shaft 82, to maintain a seal between piston 14 and input shaft 82. Transmission input shaft 82 is connected to flange 48 via spline 78.

Figure 3A:
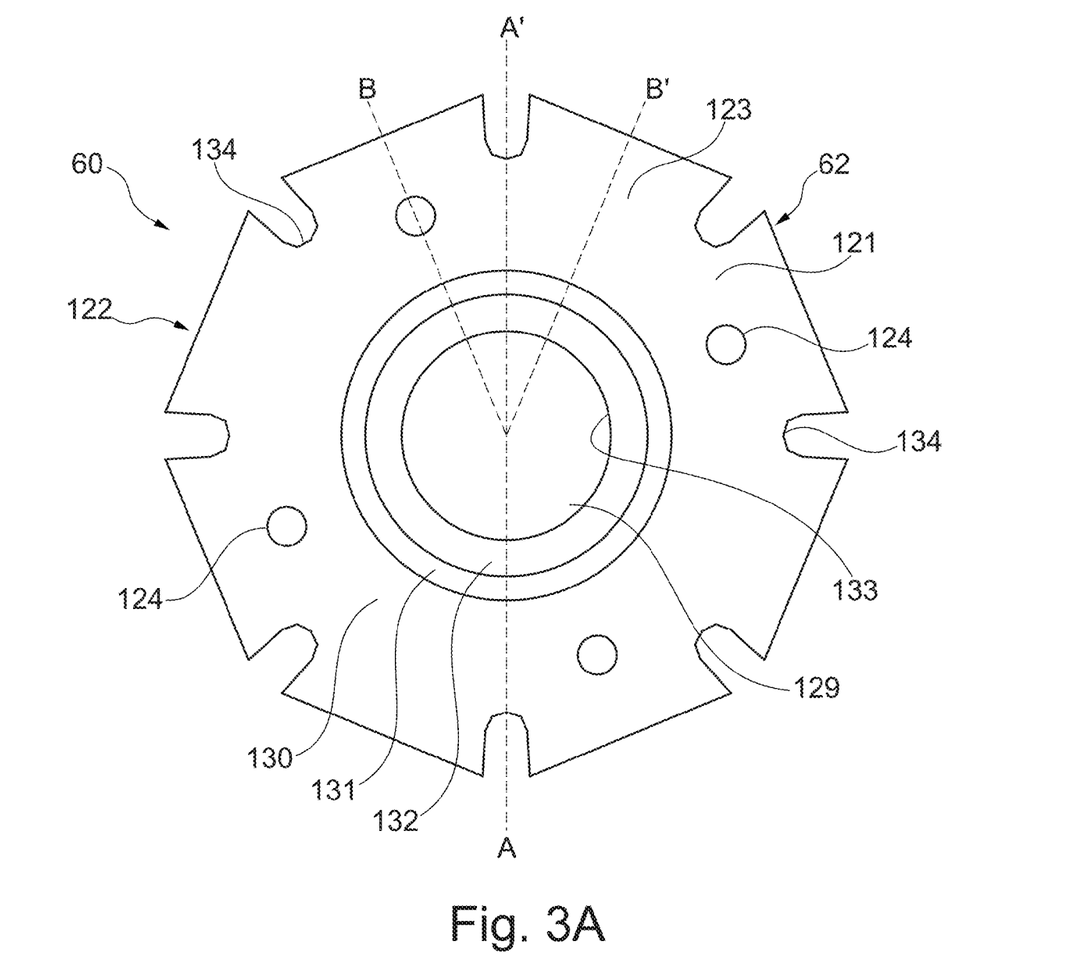
FIG. 3A illustrates a front view of a seal retention plate according to an example aspect.

FIG. 3A illustrates a front view of a seal retention plate according to an example aspect. Seal retention plate 60 comprises annular body portion 62 having first surface 121 and second surface 122 opposite first surface 121. Seal retention plate 60 further comprises interior portion 123 having at least one first hole 124. In the view according to FIG. 3A, at least one radially outer tab 125 extends from interior portion 123 and is folded so that the outer tab contacts the second surface to provide thrust surface 128; therefore, outer tab 125 and thrust surface 128 are not viewable in FIG. 3A but will be detailed further in FIG. 4. Interior portion 123 of seal retention plate 60 includes first radial portion 130, slant portion 131, second radial portion 132, inner circumferential edge 133, and center opening 129. Slant portion 131 protrudes out from first radial portion 130. That is, first radial portion 130 and second radial portion 132 are arranged in parallel displacement to one another; slant portion 131 is located therebetween.

Recesses or cutout portions, which may be curved, are referred to interchangeably herein as scallops. Scallops 134 are located at opposite sides of outer tabs 125. Scallops may be varied in shape or size. Scallops are typically formed during stamping of the seal retention plate prior to folding of the outer tabs. The scallop design may be optimized to prolong stamping tool life. Scallops form a corner with the base of the outer tabs.

Figure 3B:
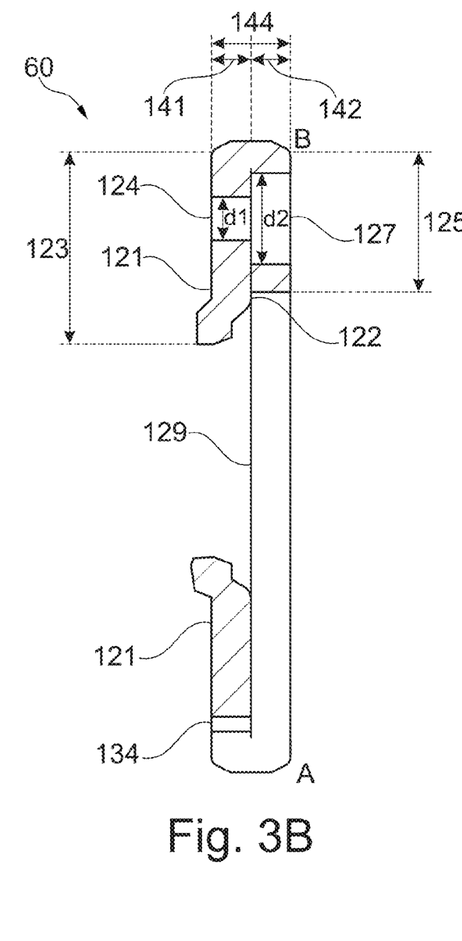
FIG. 3B illustrates a side view of a seal retention plate along line A-B according to an example aspect.

FIG. 3B illustrates a side view of a seal retention plate along line A-B of FIG. 3A according to an example aspect. Seal retention plate 60 includes first surface 121 and, opposite thereto, second surface 122. Interior portion 123, having thickness 141, includes first hole 124 having diameter d1, which is suitable for receiving a fastener such as a rivet. Outer tab 125, having thickness 142, optionally includes second hole 127 having diameter d2, which is suitable for receiving an end of a fastener such as a rivet head. Total thickness 144 includes the sum of interior portion thickness 141 and outer tab thickness 142. In an example aspect, thicknesses 141 and 142 are approximately same or equal. Scallops 134 are located between outer tabs 125 and are viewable along line A-A' (as referenced on FIG. 3A).

Figure 3C:
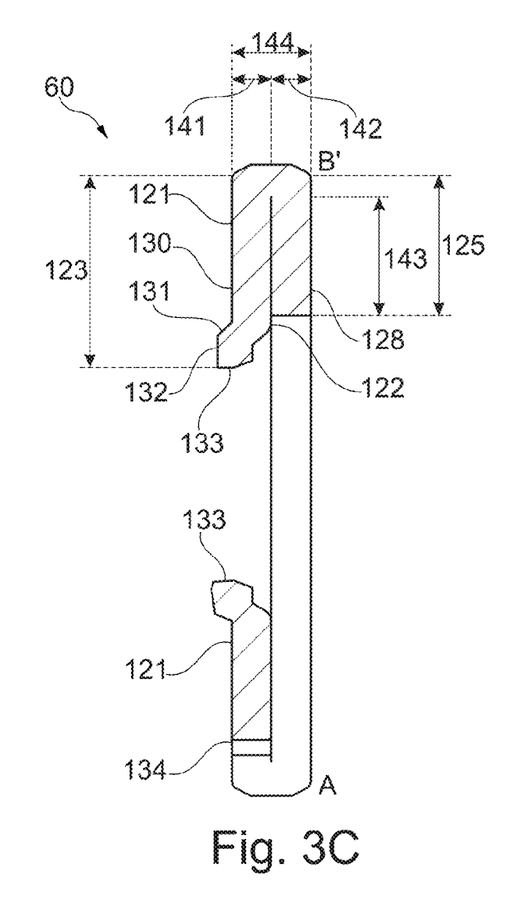
FIG. 3C illustrates a side view of a seal retention plate along line A-B' according to an example aspect.

FIG. 3C illustrates a side view of a seal retention plate along line A-B' of FIG. 3A according to an example aspect. Seal retention plate 60 includes first surface 121 and, opposite thereto, second surface 122. Interior portion 123, having thickness 141, includes first radial portion 130, slant portion 131, second radial portion 132, and inner circumferential edge 133. Thrust portion 143 includes thrust surface 128. In an example aspect, seal retention plate 60 includes a plurality of outer tabs 125 having thickness 142 wherein alternate, or every second, tabs do not include the optional second hole as in FIG. 3C. Total thickness 144 includes the sum of interior portion thickness 141 and outer tab thickness 142. In an example aspect, thicknesses 141 and 142 are approximately same or equal. Thrust portion 143 has total thickness 144, or wherein thicknesses 141 and 142 are approximately same or equal, a total thickness equal to about twice the thickness of the interior portion 123 or outer tab 125.

Figure 4:
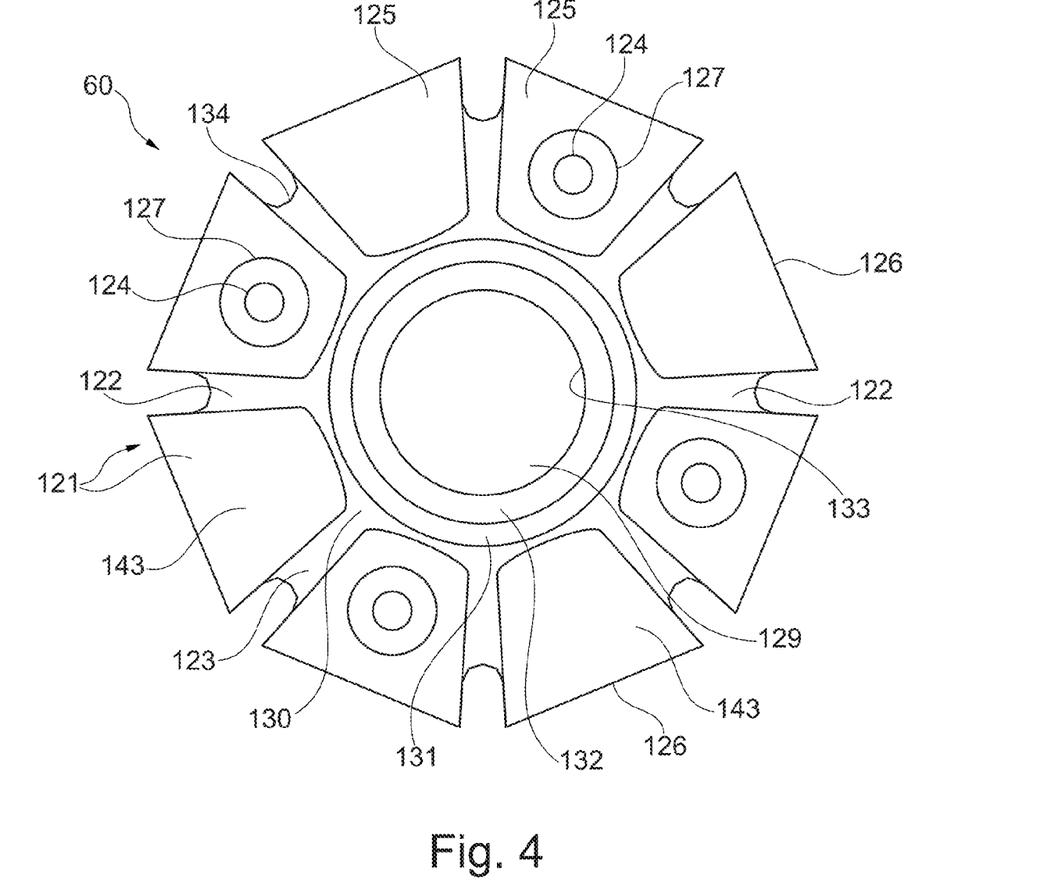
FIG. 4 illustrates a back view of a seal retention plate according to an example aspect.

FIG. 4 illustrates a back view of a seal retention plate according to an example aspect. Seal retention plate 60 includes includes second surface 122 and, opposite thereto, first surface 121. First hole 124, suitable for receiving a fastener such as a rivet, is aligned with second hole 127, suitable for receiving a fastener end such as a rivet head.

Outer tabs 125 may optionally or alternately include second holes 127. In an example aspect, holes 127 are included on alternate tabs. In other example aspects, holes 127 are included in every third, every fourth, every fifth tab and so forth. Outer tabs 125 include scallops 134 between tabs and folded portions 126 at base of tabs.

Interior portion 123 of seal retention plate 60 includes first radial portion 130, slant portion 131, second radial portion 132, inner circumferential edge 133, and center opening 129. Slant portion 131 protrudes inward from first radial portion 130. That is, first radial portion 130 and second radial portion 132 are arranged in parallel displacement to one another; slant portion 131 is located therebetween. In other words, with respect to the back view as in FIG. 4 of seal retention plate 60, the second radial portion 130 protrudes in a direction away from the folded outer tabs.

Figure 5:
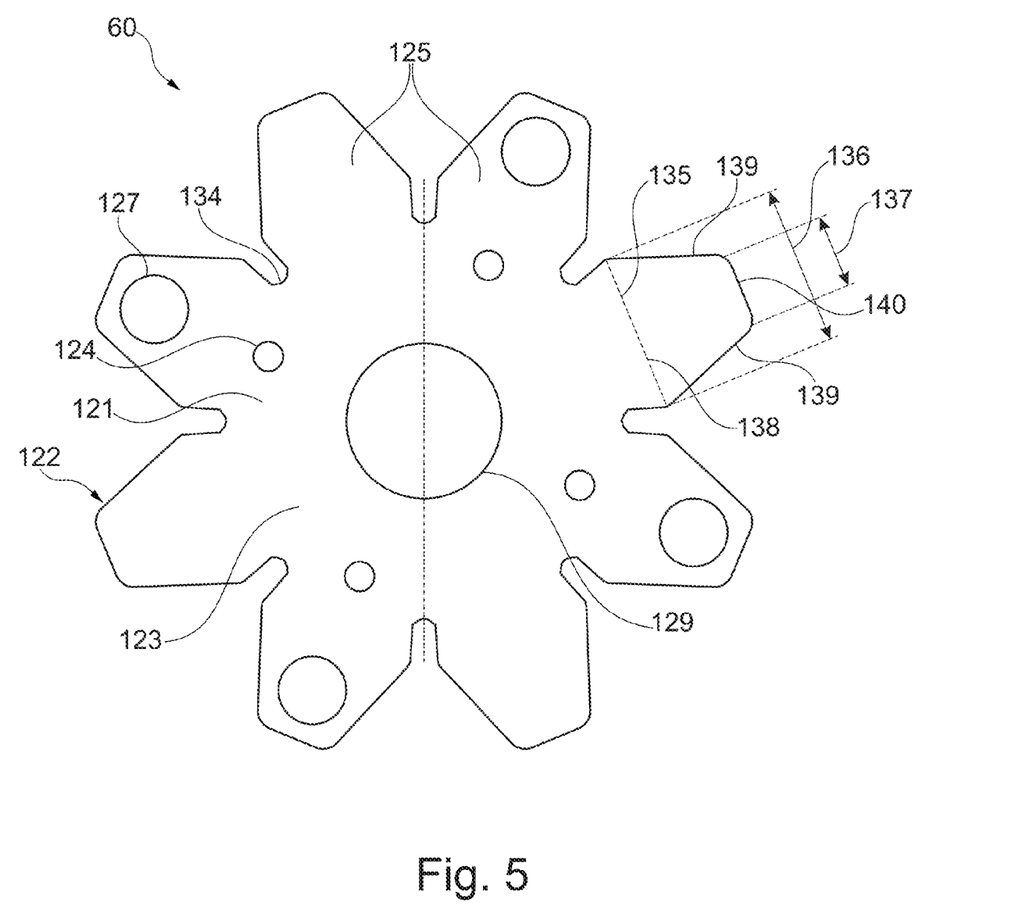
FIG. 5 illustrates a front view of a seal retention plate prior to folding according to an example aspect.
Figure 6:
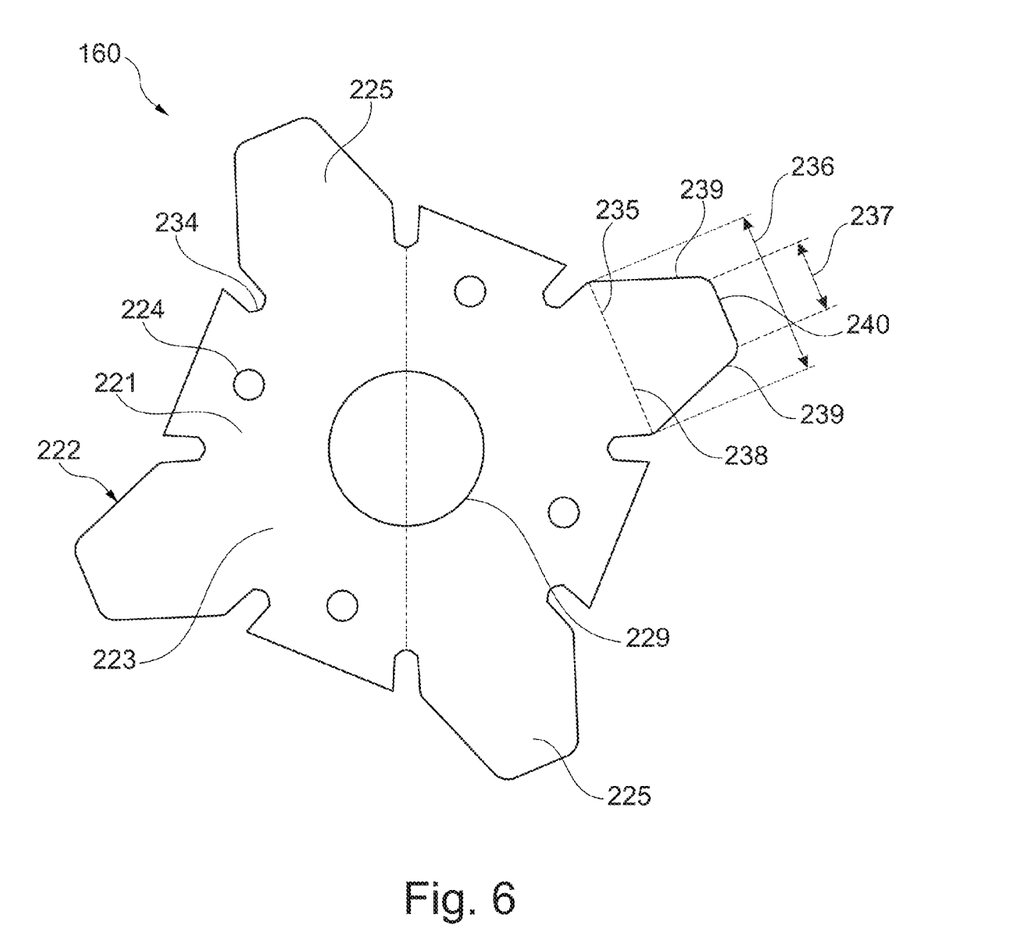
FIG. 6 illustrates an alternate front view of a seal retention plate prior to folding according to an example aspect.

FIGS. 5 and 6 illustrate alternate front views of seal retention plates prior to folding according to example aspects. The unfolded views illustrate the seal retention plate prior to completion of forming by methods known in the art. In an example aspect, the seal retention plates are formed by stamping.

FIG. 5 illustrates a front view of a seal retention plate prior to folding according to an example aspect. Seal retention plate 60 includes first surface 121, second surface 122, scallops 134, interior portion 123, and outer tabs 125. Outer tabs 125 include base 135 and radially outward tapered sides 139, where each tab 125 is folded along line 138, also referred to as baseline, located at the base and connects the sides of the base where tab width 136 is greatest. By 'radially outward tapered sides', it is meant that the tab width is greatest at the base, and the tab width gradually decreases until reaching outer tab tip 140 having width 137. The geometry of the tabs is variable and tailored accordingly to accommodate folding tabs 125 so that each tab comes in contact with second surface 122, opposite first surface 121, but without tabs overlapping or coming into contact with each other. FIG. 5 shows first hole 124 in interior portion 123 and second hole 127 on outer tab 125. In order to align the holes after folding, holes 124 and 127 are arranged colinear in a radial direction. In an example aspect, alternate tabs include hole 127, while every other, or every second, tab is devoid of hole 127. Wherein tab 125 does not include hole 127, the interior portion 123 is devoid of corresponding radially colinear hole 124. In other example aspects, every third, every fourth, or every fifth tab and so forth includes hole 127.

FIG. 6 illustrates an alternate front view of a seal retention plate prior to folding according to an example aspect. Seal retention plate 160 shows an embodiment in which outer tabs extend from interior portion alternately. In an example aspect seal retention plate 160 is devoid of second holes. Seal retention plate 160 includes first surface 221, second surface 222, scallops 234, interior portion 223, and outer tabs 225. Outer tabs 225 include base 235 and radially outward tapered sides 239, where each tab 225 is folded along line 238, also referred to as baseline, located at the base and connects the sides of the base where tab width 236 is greatest. By 'radially outward tapered sides', it is meant that the tab width is greatest at the base, and the tab width gradually decreases until reaching outer tab tip 240 having width 237. FIG. 6 shows first hole 224 in interior portion 223. In an example aspect, outer tabs 225 are substantially devoid of holes. Outer tabs 225 are subsequently folded along line 238 until tab comes in contact with second surface 222 to provide thrust surface (not shown).

Referring again to FIGS. 1-6, example aspects broadly comprise seal retention plate 60 for torque converter 10. Plate 60 comprises: annular body portion 62 having first surface 121, second surface 122 opposite first surface 121, and interior portion 123 having at least one first hole 124; at least one radially outer tab 125 extending from interior portion 123 and folded to contact second surface 122 so as to provide thrust surface 128; and center opening 129. In an example aspect, the at least one radially outer tab 125 includes second hole 127, where second hole 127 is aligned with first hole 124 and where the diameter d2 of second hole 127 is greater than diameter d1 of first hole 124. In an example aspect, first hole 124 is arranged for receiving fastener or rivet 74 and second hole 127 is arranged for receiving fastener end or rivet head 76. In an example aspect, the fastener is a rivet.

In an example aspect, plate 60 includes a plurality of outer tabs 125 wherein each alternate tab includes second hole 127 for receiving rivet head 74. In an example aspect, plate 60 includes scallops 134 disposed on opposite sides of outer tabs 125, where scallops 134 extend at least partially into interior portion 123. In an example aspect, the at least one tab 125 includes base 135 having first width 136, radially outward tapered sides 139, and tip 140 having second width 137, and where first width 136 is greater than second width 137. In an example aspect, tabs 125 are folded along line 138 connecting sides 139 at base 135. In an example aspect, interior portion 123 includes first radial portion 130, slant portion 131, and second radial portion 132. In an example aspect, first radial portion 130 and second radial portion 132 are arranged in parallel displacement to each other, and having slant portion 131 located therebetween.

Other example aspects broadly comprise piston seal assembly 15 comprising: piston 14 including recess 146 on first inner radial portion 147; a seal retention plate 60 having: interior portion 123 having first thickness 141; a plurality of radially outer tabs 125 having second thickness 142 extending from interior portion 123, each tab 125 having base 135 and radially outward tapered sides 139, each tab 125 folded along base 135 so as to contact interior portion 123 and to provide thrust portion 143 having total thickness 144; and center opening 129; at least one fastener 74 for fixedly attaching piston 14 to seal retention plate 60; and seal 80 located between piston recess 146 and interior portion 123 of seal retention plate 60. In an example aspect, first thickness 141 is equal to second thickness 142. In an example aspect, seal 80 is arranged for sealing engagement with transmission input shaft 82, and where piston 14 is arranged to be slidably supported on transmission input shaft 82. In an example aspect, interior portion 123 includes first hole 124 and outer tab 125 includes second hole 127, where second hole 127 is aligned with first hole 124 and where diameter d2 of second hole 127 is greater than diameter d1 of first hole 124. In an example aspect, fastener 74 is a rivet including rivet head 76, and where first hole 124 is arranged for receiving rivet 74 and where second hole 127 is arranged for receiving rivet head 76. In an example aspect, rivet head 76 has third thickness 145, where third thickness 145 is at most equal to second thickness 142. In an example aspect, the plurality of outer tabs 125 alternately includes second hole 127 for receiving rivet head 76. In an example aspect, seal retention plate 60 includes scallops 134 located on opposite sides of outer tabs 125, and where scallops 134 extend at least partially into interior portion 123. In an example aspect, outer tabs 125 include base 135 having first width 136, radially outward tapered sides 139, and tip 140 having second width 137, and where first width 136 is greater than second width 137. In an example aspect, tabs 125 are folded along a line 138 connecting the sides 139 at the base 135. In an example aspect, interior portion 123 includes first radial portion 130, slant portion 131, and second radial portion 132. In an example aspect, first radial portion 130 and second radial portion 132 are arranged in parallel displacement to each other, and having slant portion 131 located therebetween. In an example aspect, second radial portion 132 cooperates with the piston recess 146 to prevent axial displacement of seal 80.

Other example aspects broadly comprise torque converter assembly 10 comprising: seal 80 arranged for sealing engagement with transmission input shaft 82; piston 14 arranged to be slidably supported on transmission input shaft 82 and including recess 146 for seal 80; flange 48; seal retention plate 60 where first surface 121 faces piston 14 and thrust surface 128 faces flange 48; and, fastener 74 for fixedly attaching piston 14 to seal retention plate 60.

Other example aspects broadly comprise torque converter assembly 10 assembly comprising: piston 14 including recess 146 on first inner radial portion 147; seal retention plate 60 having: interior portion 123 having first thickness 141; a plurality of radially outer tabs 125 having second thickness 142 extending from interior portion 123, each tab 125 having base 135 and radially outward tapered sides 139, each tab 125 folded along base 135 so as to contact the interior portion 123 and to provide thrust portion 143 having total thickness 144; and center opening 129; at least one fastener 74 for fixedly attaching piston 14 to seal retention plate 60; flange 48 facing thrust portion 143; and, seal 80 located between piston recess 146 and interior portion 123 of seal retention plate 60. In an example aspect, seal 80 is arranged for sealing engagement with transmission input shaft 82, and where piston 14 is arranged to be slidably supported on transmission input shaft 82. In an example aspect, interior portion 123 includes first hole 124 and outer tab 125 includes second hole 127, where second hole 127 is aligned with first hole 124 and where the diameter d2 of second hole 127 is greater than diameter d1 of first hole 124. In an example aspect, fastener 74 is a rivet including rivet head 76, and where first hole 124 is arranged for receiving rivet 74 and where second hole 127 is arranged for receiving rivet head 76, and where rivet head 76 has third thickness 145, where third thickness 145 is at most equal to second thickness 142. In an example aspect, seal retention plate 60 includes scallops 134 located on opposite sides of outer tabs 125, and where scallops 134 extend at least partially into interior portion 123. In an example aspect, interior portion 123 includes first radial portion 130, slant portion 131, and second radial portion 132, and where first radial portion 130 and second radial portion 132 are arranged in parallel displacement to each other, and having slant portion 131 located therebetween, and where second radial portion 132 cooperates with piston recess 146 to prevent axial displacement of seal 80.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What I claim is:

1. A seal retention plate for a torque converter, the plate comprising:
   an annular body portion having:

a first surface;
a second surface opposite the first surface;
an interior portion having at least one first hole;
at least one radially outer tab extending from the interior portion and folded to contact the second surface so as to provide a thrust surface; and
a center opening.

2. The seal retention plate of claim 1, wherein the at least one radially outer tab includes a second hole, wherein the second hole is aligned with the first hole and wherein the diameter of the second hole is greater than the diameter of the first hole.

3. The seal retention plate of claim 2, wherein the first hole is arranged for receiving a rivet and wherein the second hole is arranged for receiving a rivet head.

4. The seal retention plate of claim 1, wherein the at least one tab includes a base having a first width, radially outward tapered sides, and a tip having a second width, and wherein the first width is greater than the second width.

5. The seal retention plate of claim 1, wherein the interior portion includes a first radial portion, a slant portion, and a second radial portion.

6. The seal retention plate of claim 5, wherein the first radial portion and the second radial portion are arranged in parallel displacement to each other, and having the slant portion located therebetween.

7. A piston seal assembly comprising:
a piston including a recess on a first inner radial portion;
a seal retention plate having:
    an interior portion having a first thickness;
    a plurality of radially outer tabs having a second thickness extending from the interior portion, each tab having a base and radially outward tapered sides, each tab folded along the base so as to contact the interior portion and to provide a thrust portion having a total thickness; and
    a center opening;
at least one fastener for fixedly attaching the piston to the seal retention plate; and
a seal located between the piston recess and the interior portion of the seal retention plate.

8. The piston seal assembly of claim 7, wherein the first thickness is equal to the second thickness.

9. The piston seal assembly of claim 7, wherein the seal is arranged for sealing engagement with a transmission input shaft, and wherein the piston is arranged to be slidably supported on the transmission input shaft.

10. The piston seal assembly of claim 7, wherein the interior portion includes a first hole and the outer tab includes a second hole, wherein the second hole is aligned with the first hole and wherein the diameter of the second hole is greater than the diameter of the first hole.

11. The piston seal assembly of claim 10, wherein the fastener is a rivet including a rivet head, and wherein the first hole is arranged for receiving the rivet and wherein the second hole is arranged for receiving the rivet head; and wherein the rivet head has a third thickness, wherein the third thickness is at most equal to the second thickness.

12. The piston seal assembly of claim 7 wherein the interior portion includes a first radial portion, a slant portion, and a second radial portion.

13. The piston seal assembly of claim 12 wherein the first radial portion and the second radial portion are arranged in parallel displacement to each other having the slant portion located therebetween; and wherein the second radial portion cooperates with the piston recess to prevent axial displacement of the seal.

14. A torque converter assembly comprising:
a seal arranged for sealing engagement with a transmission input shaft;
a piston arranged to be slidably supported on the transmission input shaft and including a recess for the seal;
a flange;
the seal retention plate of claim 1 wherein the first surface faces the piston and the thrust surface faces the flange; and,
a fastener for fixedly attaching the piston to the seal retention plate.

15. A torque converter assembly assembly comprising:
a piston including a recess on a first inner radial portion;
a seal retention plate having:
    an interior portion having a first thickness;
    a plurality of radially outer tabs having a second thickness extending from the interior portion, each tab having a base and radially outward tapered sides, each tab folded along the base so as to contact the interior portion and to provide a thrust portion having a total thickness; and
    a center opening;
at least one fastener for fixedly attaching the piston to the seal retention plate;
a flange facing the thrust portion; and,
a seal located between the piston recess and the interior portion of the seal retention plate.

16. The torque converter assembly of claim 15 wherein the seal is arranged for sealing engagement with a transmission input shaft, and wherein the piston is arranged to be slidably supported on the transmission input shaft.

17. The torque converter assembly of claim 15 wherein the interior portion includes a first hole and the outer tab includes a second hole, wherein the second hole is aligned with the first hole and wherein the diameter of the second hole is greater than the diameter of the first hole.

18. The torque converter assembly of claim 17 wherein the fastener is a rivet including a rivet head, and wherein the first hole is arranged for receiving the rivet and wherein the second hole is arranged for receiving the rivet head, and wherein the rivet head has a third thickness, wherein the third thickness is at most equal to the second thickness.

19. The torque converter assembly of claim 15 wherein the seal retention plate includes scallops located on opposite sides of the outer tabs, and where the scallops extend at least partially into the interior portion.

20. The torque converter assembly of claim 15 wherein the interior portion includes a first radial portion, a slant portion, and a second radial portion, and wherein the first radial portion and the second radial portion are arranged in parallel displacement to each other, and having the slant portion located therebetween, and wherein the second radial portion cooperates with the piston recess to prevent axial displacement of the seal.

* * * * *